US007548094B2

(12) United States Patent
Shepard et al.

(10) Patent No.: US 7,548,094 B2
(45) Date of Patent: Jun. 16, 2009

(54) SYSTEMS AND METHODS FOR ON-CHIP SIGNALING

(75) Inventors: Kenneth L. Shepard, Ossining, NY (US); Anup P. Jose, Acton, MA (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 11/654,286

(22) Filed: Jan. 17, 2007

(65) Prior Publication Data

US 2007/0300005 A1 Dec. 27, 2007

Related U.S. Application Data

(60) Provisional application No. 60/759,687, filed on Jan. 17, 2006.

(51) Int. Cl.
*H03K 19/0175* (2006.01)
*H03K 19/02* (2006.01)

(52) U.S. Cl. ........................................ 326/82; 326/135

(58) Field of Classification Search .................. 326/31, 326/82, 135; 327/498, 568
See application file for complete search history.

(56) References Cited

U.S. PATENT DOCUMENTS 4,554,415 A * 11/1985 Sasano ....................... 370/293

OTHER PUBLICATIONS

Bubmann, M. et al., "Active Compensation of Interconnect Losses for Multi-GHz Clock Distribution Networks," IEEE Transactions on Circuits and Systems-II: Analog and Digital Signal Processing, vol. 39, No. 11, Nov. 1992.

Chang, R.T. et al., "Near Speed-of-Light Signaling Over On-Chip Electrical Interconnects," IEEE Journal of Solid-State Circuits, vol. 38, No. 5, May 2003.

Ho, R. et al., "The Future of Wires," Proceedings of the IEEE, vol. 89, No. 4, Apr. 2001.

Jose, A.P. et al., "Near Speed-of-Light On-Chip Interconnects Using Pulsed Current-Mode Signaling," 2005 Symposium on VLSI Circuits Digest of Technical Papers.

* cited by examiner

*Primary Examiner*—Daniel D Chang
(74) *Attorney, Agent, or Firm*—Wilmer Cutler Pickering Hale and Dorr LLP

(57) ABSTRACT

Systems and methods for on-chip signaling are disclosed. In some embodiments, an integrated circuit having on-chip signaling between a first component and a second component includes, a differential interconnect capable of coupling the first component to the second component, a driver capable of being coupled to the first component that sends data on the differential interconnect, a receiver capable of being coupled to the second component that receives the data, and a plurality of negative impedance converters capable of being coupled to the differential interconnect that provide loss compensation.

17 Claims, 13 Drawing Sheets

1020
Serialized Bitstream
$D_0$ $D_1$ $D_2$ x 2x 4x
$\overline{D_0}$ $\overline{D_1}$ $\overline{D_2}$ x 2x 4x
$2Z_0$
1010
1030
$2Z_0$
Ø Ø Ø Ø
1050
1060
D $\overline{D}$
3 3
Data1
Data2
(1.5 Gb/s)
Data Skew
Pre-driver & Power-control
NIC
1040
Clock Skew Calibration
1080
Data Deskew
1090
Data1 Data2
Ref Clk
(1.5 GHz)
Ext Clk
PLL
1070

SYSTEMS AND METHODS FOR ON-CHIP SIGNALING

CROSS-REFERENCE TO RELATED APPLICATIONS

This application claims the benefit of U.S. Provisional Patent Application No. 60/759,687, filed on Jan. 17, 2006 and entitled "Distributed Loss Compensation For Low-Latency On-Chip Interconnects," which is hereby incorporated by reference herein in its entirety.

TECHNOLOGICAL FIELD

The disclosed subject matter relates to systems and methods for on-chip signaling.

BACKGROUND

On-chip interconnects, such as wires, are used to connect different parts of an integrated circuit together. The delay of a wire is approximately equal to $R_{wire}*C_{wire}*L^2$ (where $R_{wire}$ is the resistance of the wire per unit length, $C_{wire}$ is the capacitance per unit length, and L is the length of the wire). From this equation it can be seen that, as the length of a wire decreases, the delay of the wire also decreases. Therefore, the latency of a wire decreases along with feature size scaling. The delays associated with gates also decrease with feature size scaling. However, because the gate delays are shrinking faster than the interconnect delays, the relative delay of interconnects to gates is increasing with feature size scaling. The delay per unit length of interconnects relative to gate delays approximately doubles every technology generation.

One way to reduce the delay of a wire is to break it into multiple smaller segments using buffers or repeaters. This makes the delay of the wire grow linearly with the number of segments. Wider wires can also be used to improve overall delay, because they require a fewer numbers of repeaters. However, wider wires also require more energy per bit to drive because of their larger capacitance, and they take up a greater amount of space on an integrated circuit.

For example, optimally repeated copper wires of typically minimum width and spacing deliver a relatively constant delay per unit length, increasing from 55 ps/mm for 0.18 μm technology to approximately 80 ps/mm in 35 nm technology. However, when measured proportionally to gate delay, this delay per mm increases dramatically from 1 FO4 (fanout of 4) gate delay in a 0.18 μm technology to 7 FO4 gate delays in a 35 nm technology. This shows that, although wires may have a relatively constant delay per unit length, when compared to decreasing gate delays, the relative delay of interconnect is actually increasing.

SUMMARY

Systems and methods for on-chip signaling are disclosed.

In some embodiments, an integrated circuit having on-chip signaling between a first component and a second component includes, a differential interconnect capable of coupling the first component to the second component, a driver capable of being coupled to the first component that sends data on the differential interconnect, a receiver capable of being coupled to the second component that receives the data, and a plurality of negative impedance converters capable of being coupled to the differential interconnect that provide loss compensation.

In some embodiments, a method for on-chip signaling on an integrated circuit includes, transmitting a data signal from a first component on the integrated circuit to a second component on the integrated circuit over a differential interconnect, and providing a differential admittance to the data signal.

In some embodiments, systems for an integrated circuit having on-chip signaling between a first component and a second component include, a means for coupling the first component to the second component, a means for sending data on the means for coupling located at the first component, a means for receiving the data at the second component, and a plurality of means for providing loss compensation coupled to the means for coupling.

DETAILED DESCRIPTION

Systems and methods for on-chip signaling are provided. In some embodiments, negative impedance converters (NICs) can be used to compensate for transmission line losses in on-chip interconnects. The NICs can include a source degeneration network to compensate for attenuation of a signal on the interconnect. The interconnect can be a pair of differentially operated wires. By operating the interconnect in a double data rate manner using multiplexing, the amount of energy expended per bit transmitted can be reduced.

Figure 1A:
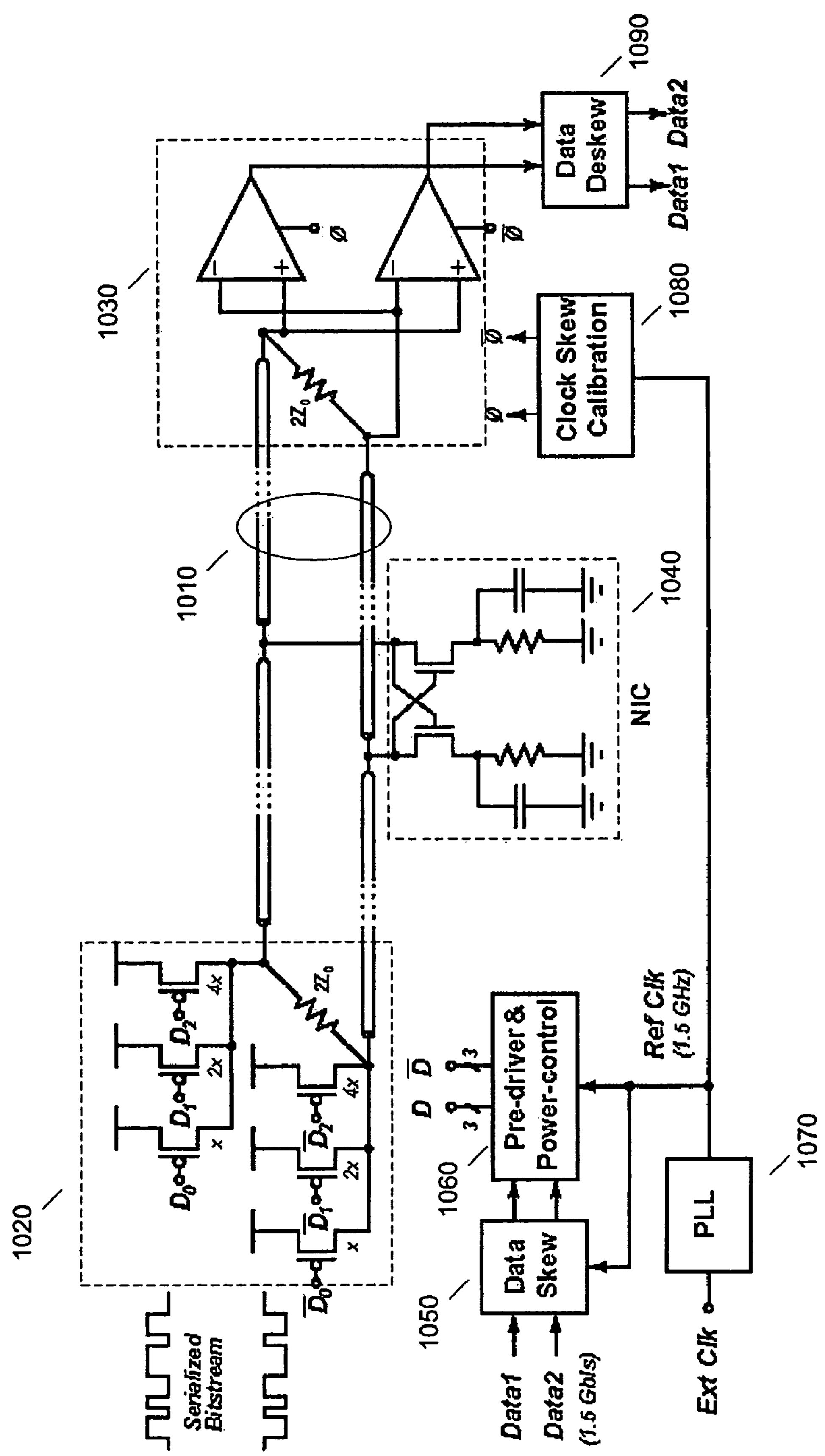
FIG. 1A is a schematic diagram of the system architecture of an on-chip signaling system in accordance with some embodiments of the disclosed subject matter.
Figure 1B:
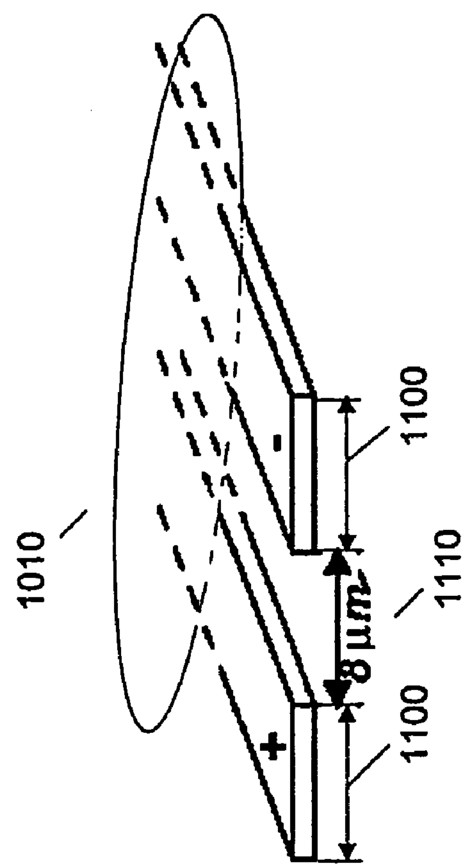
FIG. 1B is a schematic diagram of an interconnect design in accordance with some embodiments of the disclosed subject matter.

FIGS. 1A and 1B show a schematic diagram of a system architecture of an on-chip signaling system in accordance with some embodiments of the disclosed subject matter. FIG. 1 shows an interconnect 1010 used in a transmission line manner. The interconnect 1010 has a driver 1020 at one end, and a receiver 1030 at the other end. Distributed along the interconnect 1010 are one or more negative impedance converters 1040 (NICs) (although only one is shown for clarity) used to compensate for signal attenuation.

Driver 1020 and receiver 1030 can communicate at the same frequency (mesochronously), although arbitrary skews can be accommodated with an automated calibration at start-up. Phase lock loop (PLL) 1070 can be used to provide a clock signal for double data rate (DDR) data transmission. Data skew circuit 1050 and data de-skew circuit 1090 can control data skew for interconnect 1010. Pre-driver 1060 receives data from data skew circuit 1050 and multiplexes it into a single stream for transmission by driver 1020. Finally, clock skew calibration circuit 1080 can be used to calibrate receiver 1030.

FIGS. 1A and 1B show interconnect 1010 with two wires for differential operation. The advantages of differential operation include controlled inductance, high common-mode noise rejection, and reduced shielding requirements. Interconnect 1010 can be made on various levels of a process, for example, a fifth metal level of a six-level-metal process. As shown in FIG. 1B, one design for an interconnect 1010 in accordance with some embodiments of the disclosed subject matter is a co-planar waveguide topology, with a line-width 1100 of 8 μm and a spacing between lines 1110 of 8 μm.

The operating point for NICs 1040 can be set by the common-mode voltage at the driver 1020. In order to do, the driver 1020 can be programmed to inject different levels of bias current. Each level of bias current can set a different common mode voltage, and therefore a different level of compensation. For a 14 mm interconnect, seven NICs evenly spaced along the interconnect can be used to compensate for signal attenuation.

Figure 2:
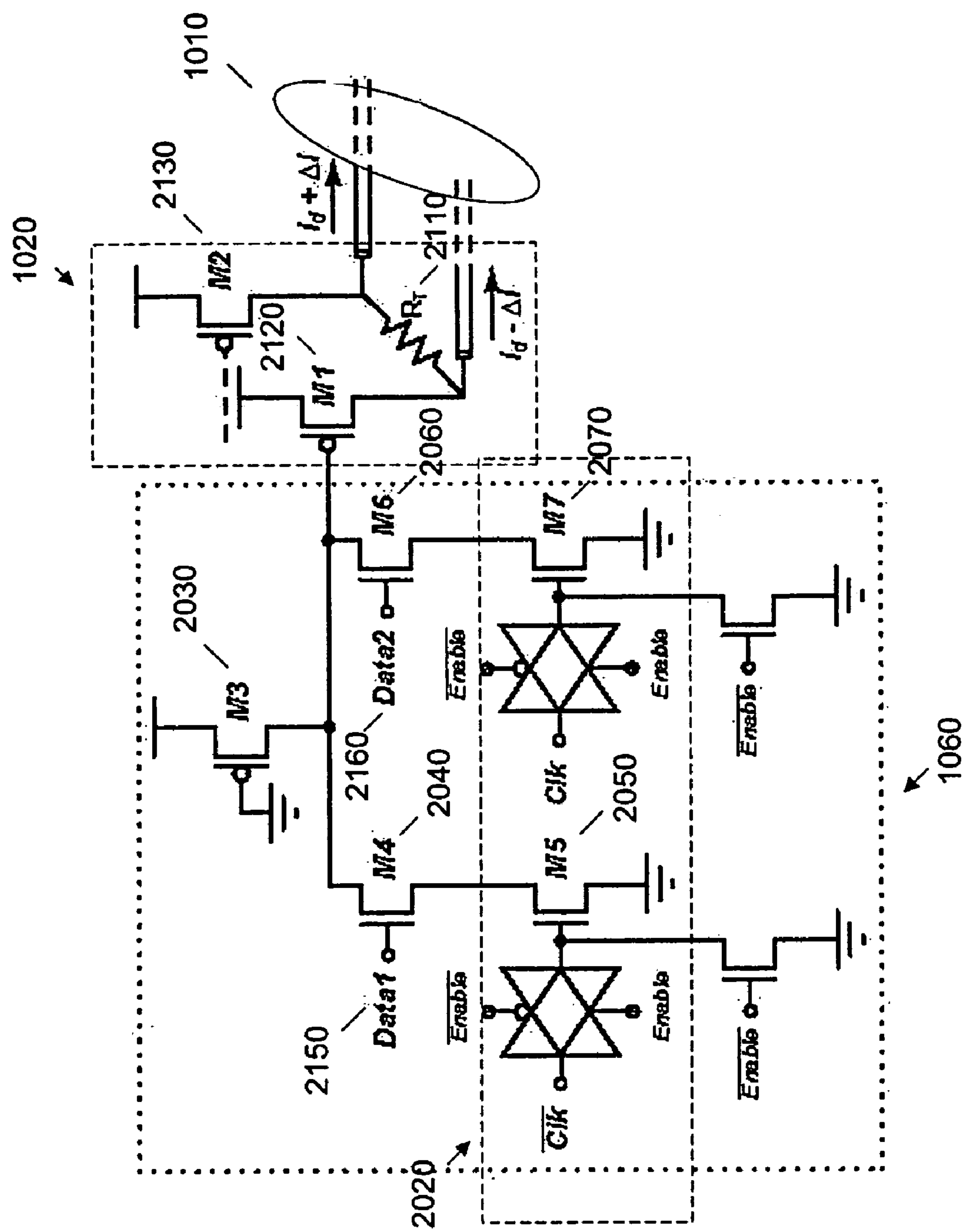
FIG. 2 is a schematic diagram of a driver in accordance with some embodiments of the disclosed subject matter.

FIG. 2 is a schematic diagram showing more details of portion of driver 1020 and pre-driver and power-control 1060 in accordance with some embodiments of the disclosed subject matter. The pre-driver 1060 can have input multiplexing 2020. Input multiplexing allows double data rate (DDR) operation to be employed. The driver 1020/pre-driver 1060 combination multiplexes two bitstreams Data1 2150 and Data2 2160.

The pre-driver stage 1060 can use ratioed logic to reduce the circuit complexity when compared to static complementary metal oxide semiconductor (CMOS) circuits, resulting in a lower area overhead. Transistors M3-M7 (2030, 2040, 2050, 2060, 2070) form a pseudo n-type metal oxide semiconductor gate, with transistor M3 2030 acting as the pull-up load.

Driver 1020 can consist of two p-type field effect transistors (pFETs) M1 2120 and M2 2130, along with a termination resistor $R_T$ 2110 to reduce the effect of reflections as well as crosstalk noise. When transistors 2120 and 2130 are pFETs, n-type field effect transistors (nFETs) can be used for the cross-coupled transistor pair in the NICs. Transistor M3 2030 can be sized relative to the pull-down transistors M4 2040, M5 2050, M6 2060, and M7 2070 to keep M1 2120 and M2 2130 in saturation. Although using pFETs in driver 1020 requires larger driver transistors than if nFETs were used, this can be compensated for by using smaller nFETs rather than pFETs in the NIC devices for a given gain.

The value of $R_T$ 2110 can be chosen to achieve a compromise between reflection and far-end voltage swing. Larger values of $R_T$ can increase the near-end voltage-swing, but can also increase reflection of signals at higher-frequencies. Because of resistive losses in the interconnect, the common-mode voltage on the wire and the associated bias currents of the NICs decrease toward the far-end of interconnect 1010. These NIC can be sized larger to provide uniform $g_m$(gain).

In accordance with some embodiments of the disclosed subject matter, there can be multiple copies of driver 1020 with varying sizes to dynamically control the drive current ($2I_D$) from 3.0 mA to 6.0 mA in steps of 0.35 mA, although other step sizes can be used. Larger driver currents (e.g., 6.0 mA) boost signaling levels as well as increase the $g_m$ of the devices in the NICs, improving interconnect bandwidth. Smaller driver currents (e.g., 3.0 mA) reduce power consumption.

Figure 3:
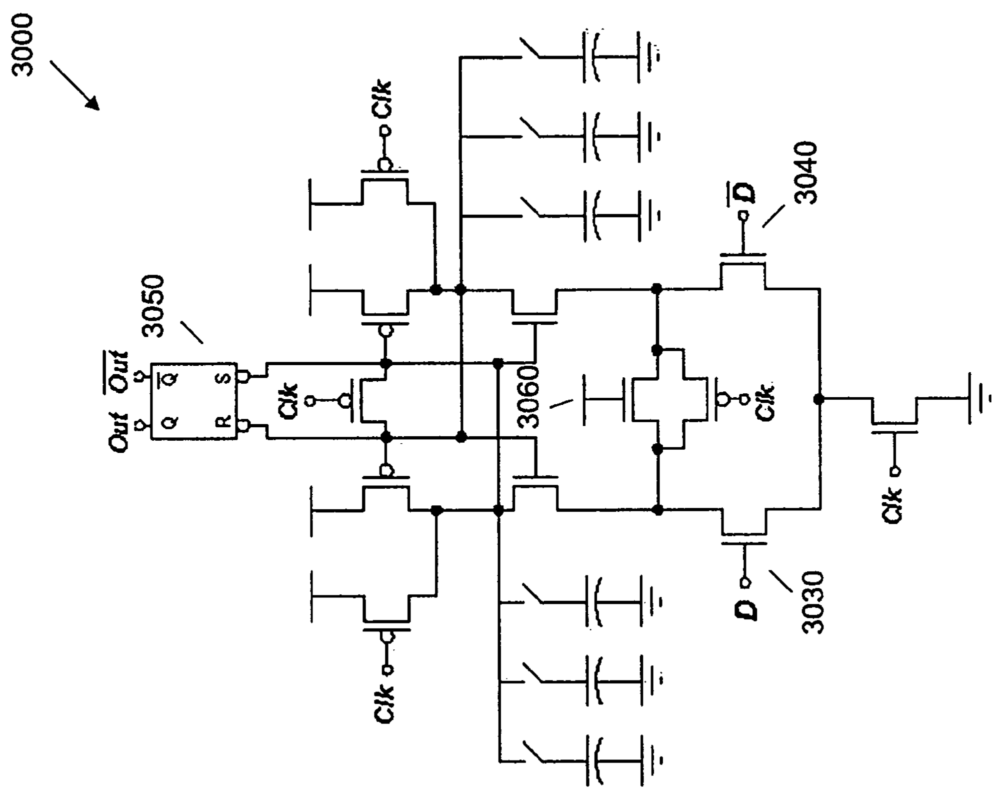
FIG. 3 is a schematic diagram of a receiver in accordance with some embodiments of the disclosed subject matter.

FIG. 3 is a schematic diagram of a receiver 3000 in accordance with some embodiments of the disclosed subject matter. Receiver 3000 has inputs D 3030 and $\overline{D}$ 3040. The receiver can also have an output latch 3050 for storing received data. The receivers can be StrongARM gate-isolated sense-amplifier latches. These latches can be differential-edge-triggered latches. The circuit for the latch can be a differential sense amp followed by a pair of cross-coupled NAND gates. These latches can provide a clock slew time of 75 ps, and an aperture time of 15 ps.

A digitally trimmed capacitive load 3060 can be used for input offset cancellation, which can be on the order of a few tens of millivolts. Increasing the size of the transistors to lower this offset voltage can degrade the overall performance of the receiver and increase the loading at the far end of interconnect 1010. Positioning trimming capacitors at the output of the latch can offer improved offset control for smaller capacitance (and switch) sizing over adding these capacitors at the drains of the differential input pair. A silicided 320 ohm polysilicon resistor can be used for line termination at the receiver. This may be slightly larger than the high-frequency impedance of the interconnect, and enough to boost far-end voltage swing while not creating an impedance discontinuity large enough to produce significant reflection at the far end.

Figure 4A:
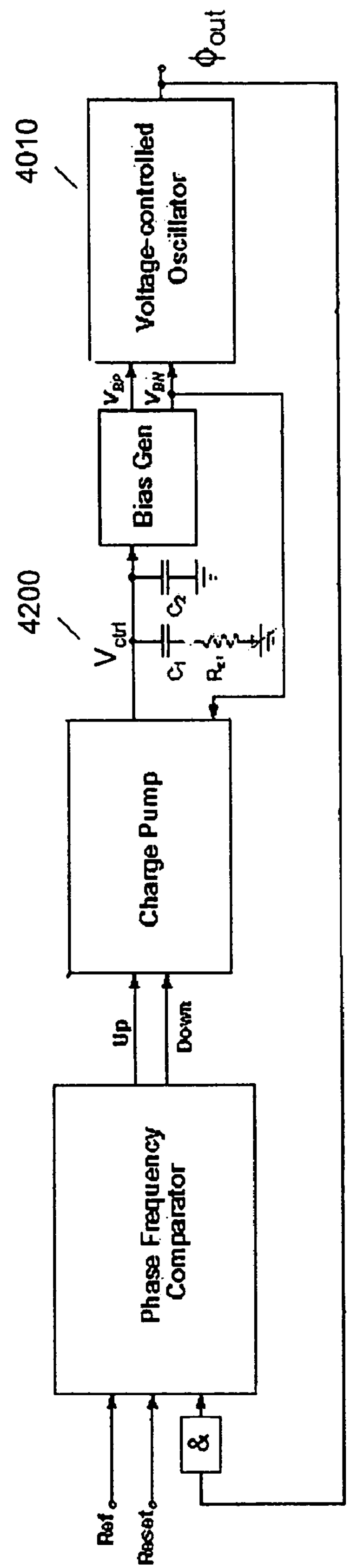
FIG. 4A is a schematic diagram of a phase lock loop in accordance with some embodiments of the disclosed subject matter.
Figure 4B:
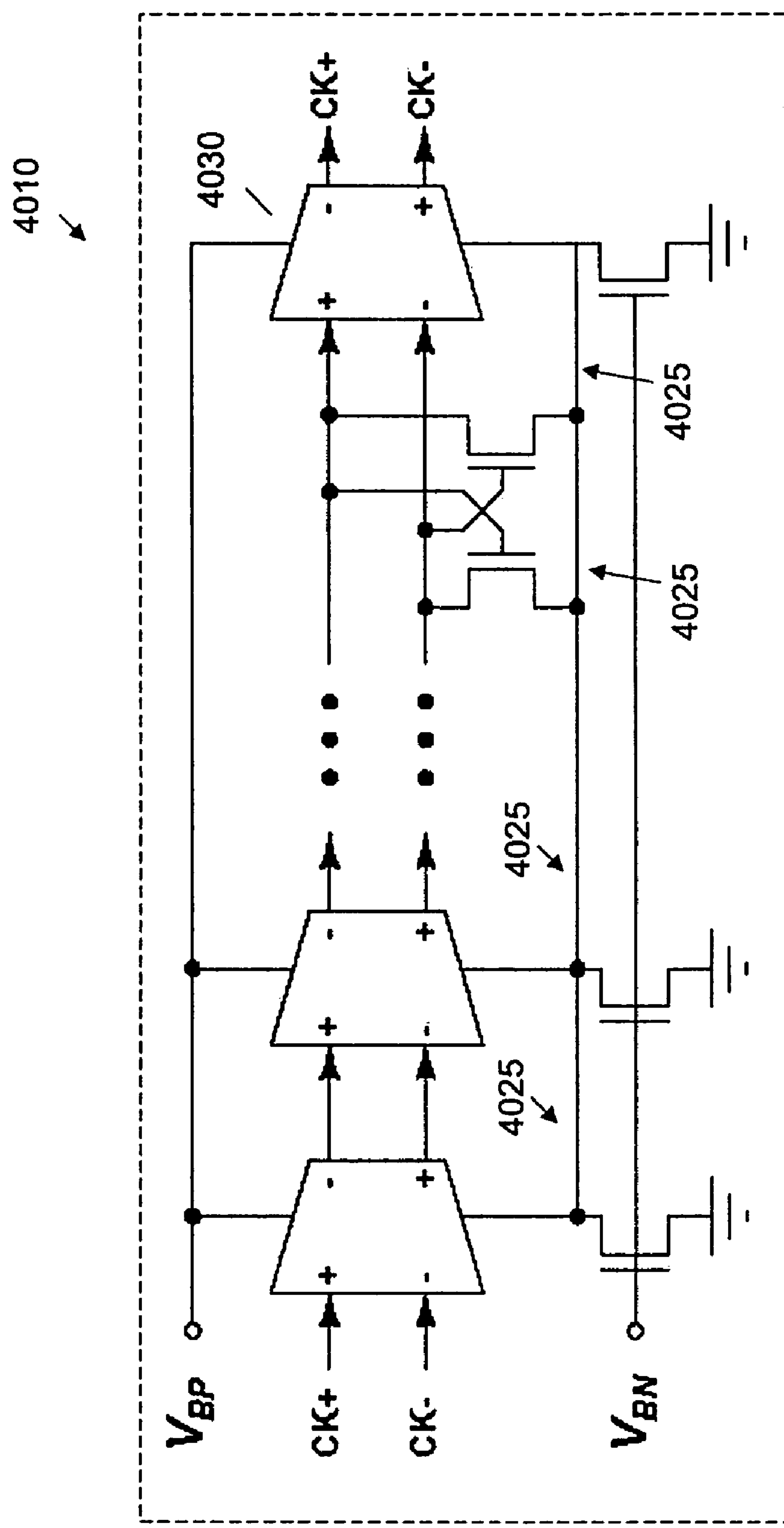
FIG. 4B is a schematic diagram of the voltage controller oscillator of a phase lock loop in accordance with some embodiments of the disclosed subject matter.

Standard PLLs known in the art can be used with some embodiments of the disclosed subject matter. An overview of an improved PLL 4000 for providing on chip-clock multiplication, in accordance with some embodiments of the disclosed subject matter, is shown in FIG. 4A. A voltage controlled oscillator 4010 and a loop filter 4200 of PLL 4000 are described below in connection with FIGS. 4B and 4C. FIG. 4B is a schematic diagram of voltage controlled oscillator 4010 of PLL 4000 shown in FIG. 4A in accordance with some embodiments of the disclosed subject matter. The current source drains ($V_{tail}$) can be connected together 4025 to reduce the variation in the tail current, further reducing power-supply-induced jitter. When the tail nodes are tied together, the VCO becomes two single-ended rings, to rectify this, a cross-coupled transistor pair 4020 can be used prior to the last stage 4030.

Figure 4C:
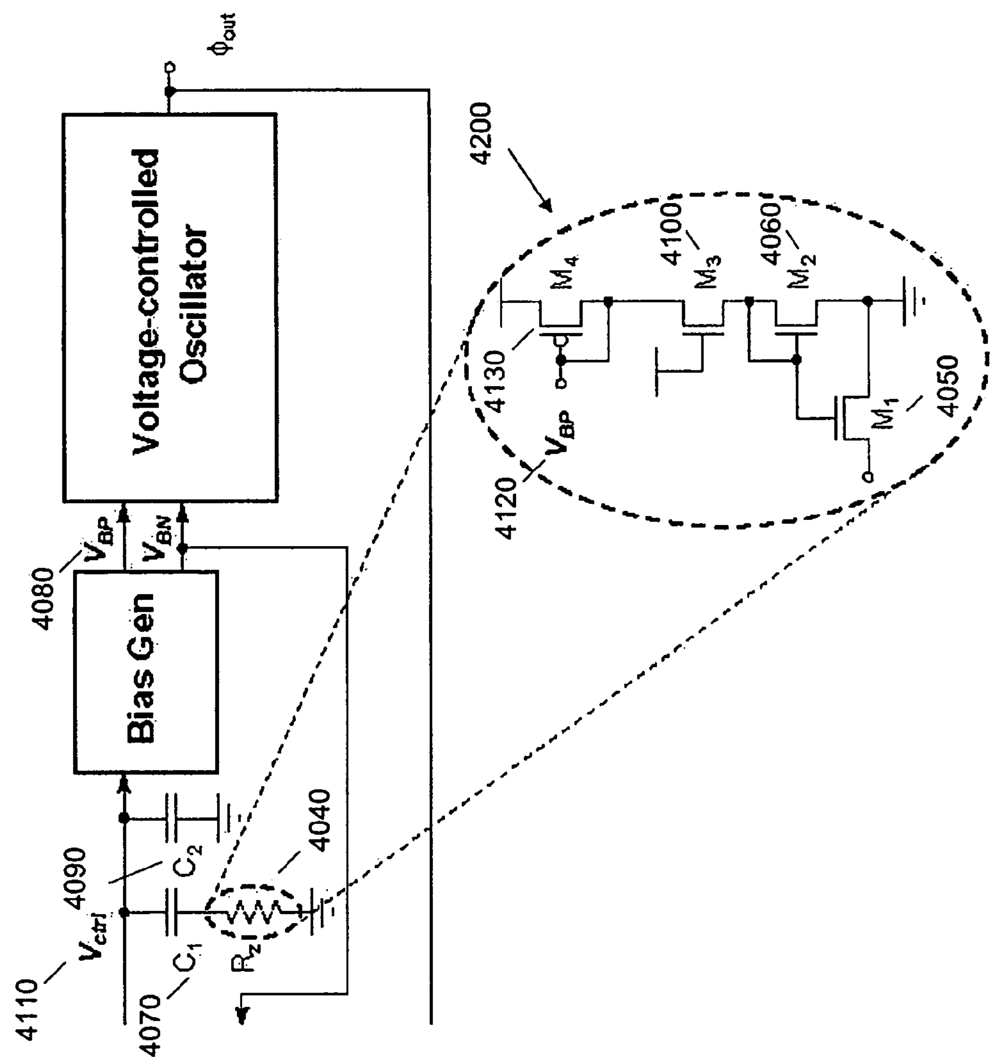
FIG. 4C is a schematic diagram of a loop filter in accordance with some embodiments of the disclosed subject matter.

FIG. 4C is a more detailed schematic diagram of a part of the PLL's 4000 feedback loop. FIG. 4C shows in more detail loop filter $R_z$ 4040 in accordance with some embodiments of the disclosed subject matter. Loop filter $R_z$ 4040 can be implemented with field effect transistors (FETs) M1 4050, M2 4060, M3 4100, and M4 4130. M1 4050 can be biased in the triode region. For transistor M1 4050, $R_{on}^{-1}=\mu C_{ox}(W/L)$ $(V_{GS}-V_{TH})$, which is equal to the transconductance of M2 4060 if both transistors have the same geometry. This resistor along with capacitor $C_1$ 4070, sets the zero of the PLL transfer function. The value of $V_{GS}-V_{TH}$, and hence the transconductance of loop filter Rs 4040, is set by transistors M2 4060 and M3 4100 along with bias voltage $V_{BP}$ 4080.

When operating in the triode region, the resistance of M1 is proportional to $1/\sqrt{I_D}$ (through $V_{BP}$ 4120), where $I_D$ is the buffer bias current. A second capacitor $C_2$ 4090 can be added to reduce the variation in $V_{ctrl}$ 4110. Setting $C_2$ to one-tenth the value of $C_1$ can be used to balance input-jitter rejection and stability of the feedback loop.

Figure 5A:
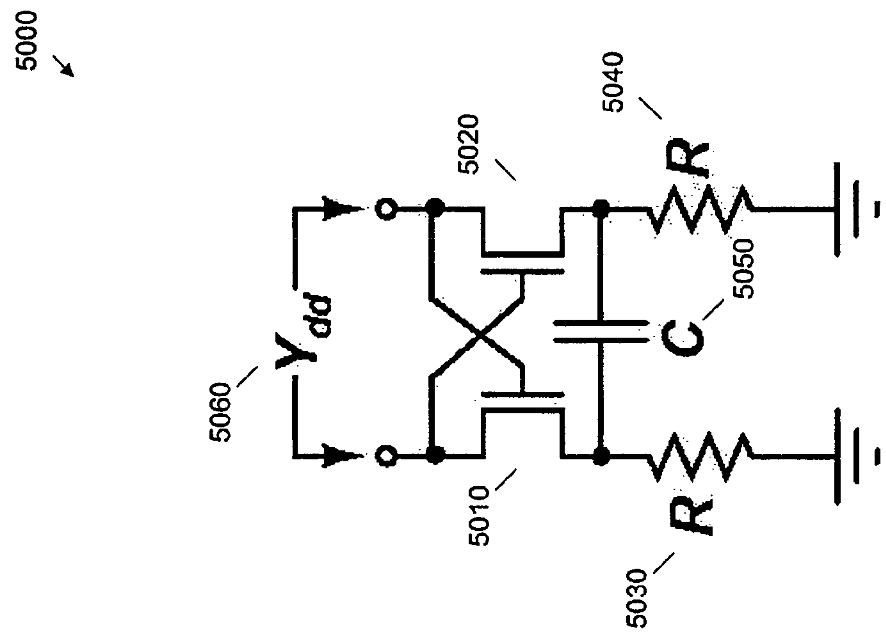
FIG. 5A is a schematic diagram of a negative impedance converter in accordance with some embodiments of the disclosed subject matter.

FIG. 5A is a schematic diagram of a negative impedance converter (NIC) 5000 in accordance with some embodiments of the disclosed subject matter. NIC 5000 can have two cross-coupled transistors 5010 and 5020. The NIC can also have a source degeneration network, one example embodiment is the resistor-capacitor network shown in FIG. 5A. The resistor-capacitor network comprises resistors 5030 and 5040 with capacitor 5050 connected between them.

Figure 5B:
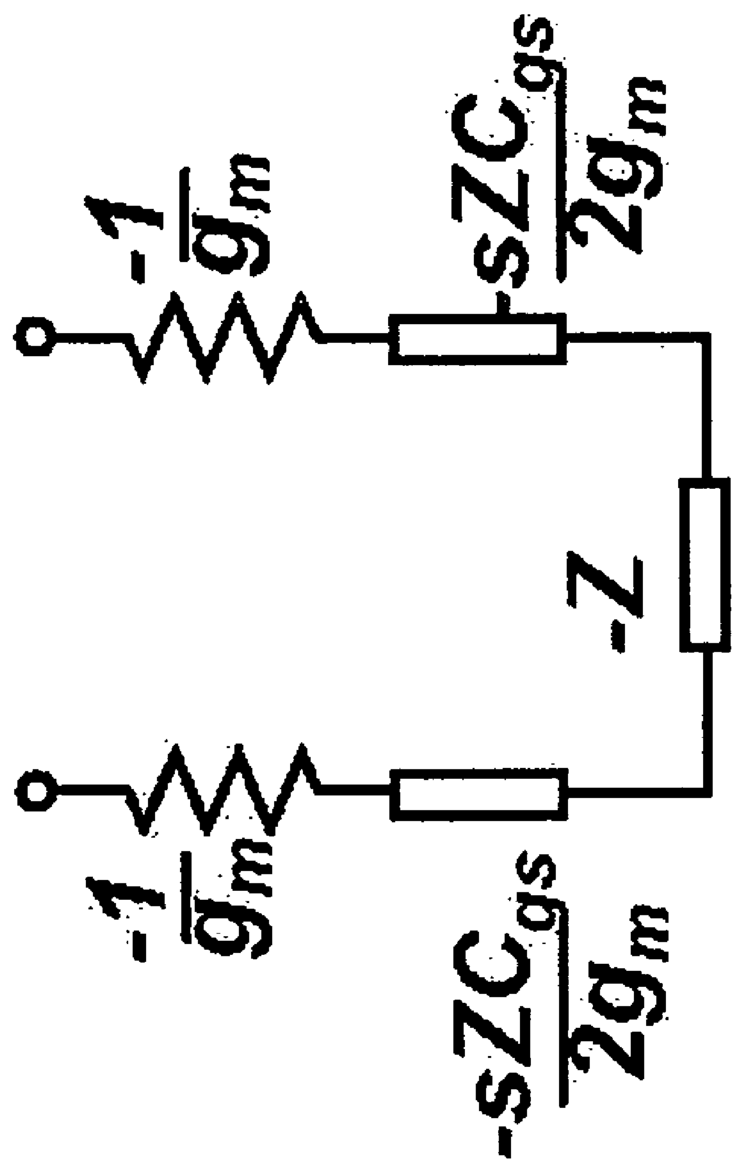
FIG. 5B shows a small signal model representing the impedance looking in at the terminals of the circuit of FIG. 5A, in accordance with some embodiments of the disclosed subject matter.

FIG. 5B shows a small signal model representing the impedance looking in at the terminals of the circuit of FIG. 5A. Transistors 5010 and 5020 are characterized by an input capacitance $C_{gs}$ and transconductance $g_m$. Based on this model, when resistance and capacitance are equal to zero in the source degeneration network, the NIC delivers a negative differential impedance 5060 of $-2/g_m$.

Turning back to FIG. 5A, at low frequencies, resistors 5030 and 5040 degenerate differential admittance $Y_{dd}$ 5060 of the NIC. As frequencies increase, capacitance 5050 acts to shunt this degeneration and increase $Y_{dd}$, providing the admittance of a negative capacitance. In this way, the cross-coupled transistor pair transforms the parallel RC combination (impedance Z) into a negative impedance (−Z). Ignoring gate-to-drain overlap capacitance, the differential admittance of the NIC, $Y_{dd}$ 5060, is given by:

$$Y_{dd} = \frac{-g_m/(2R)}{g_m+1/R}\left[\frac{1+s2RC}{1+\frac{s(C_{gs}+2C)}{g_m+1/R}}\right]$$

For R>>1/gm, and C>>$C_{gs}$, this expression approximates to:

$$Y_{dd} = -\frac{1}{2R}\left[\frac{1+s2RC}{1+s2C/g_m}\right]$$

with a pole at zero and at $g_m/2C$ and (1/(2RC)), respectively.

To give an example of a design for a NIC using these equations, assume the desired gain $g_m$=4 mS, R=1 k (which is much greater than 1/gm) and the capacitance C=600 fF. The zero of the differential admittance is at 1/(2RC), which, for the assumed values, is approximately 132 MHz. This gives a negative admittance that increases with increasing frequency (negative capacitance) until the pole is reached at approximately $g_m/2C$ or 660 MHz. This design delivers loss compensation matching for the interconnect that increases with increasing frequency.

An appropriate selection of the values for R and C maintains stability of the interconnect. Instability is the result of overcompensation of the transmission-line losses leading to excessive overshoot, oscillations, or latch-up of the transmission line. Unconditional stability requires that both of the following conditions be satisfied for the S-parameters of the compensated transmission line:

$$k = \frac{1+|S_{22}S_{11}-S_{12}S_{21}|^2-|S_{11}|^2-|S_{22}|^2}{2|S_{12}S_{21}|} > 1$$

$$|S_{12}S_{21}| < 1-|S_{11}|^2,\ |S_{12}S_{21}| < 1-|S_{22}|^2$$

For the doubly terminated transmission lines considered here, $S_{11}=S_{22}$ and $S_{12}=S_{21}$, resulting in the simplification of the above equations to:

$$k = \frac{1+|S_{11}^2-S_{21}^2|^2-2|S_{11}|^2}{2|S_{21}|^2} > 1$$

and $$|S_{21}^2| < 1-|S_{11}|^2$$

$S_{11}$ is given by $(Z_L-Z_0)/(Z_L+Z_0)$. For a matched termination at either ends of the interconnect, $S_{11}$ is approximately equal to zero, and the above expression for $S_{21}$ simplifies to:

$$|S_{21}{}^2|=|e^{-2\gamma l}|=e^{-2\alpha l}<1$$

which is true when $\alpha>0$. Therefore, unconditional stability of the compensated interconnect requires a choice of $g_m$, R, and C for the NICs such that the attenuation constant is greater than zero for all frequencies.

Figure 6A:
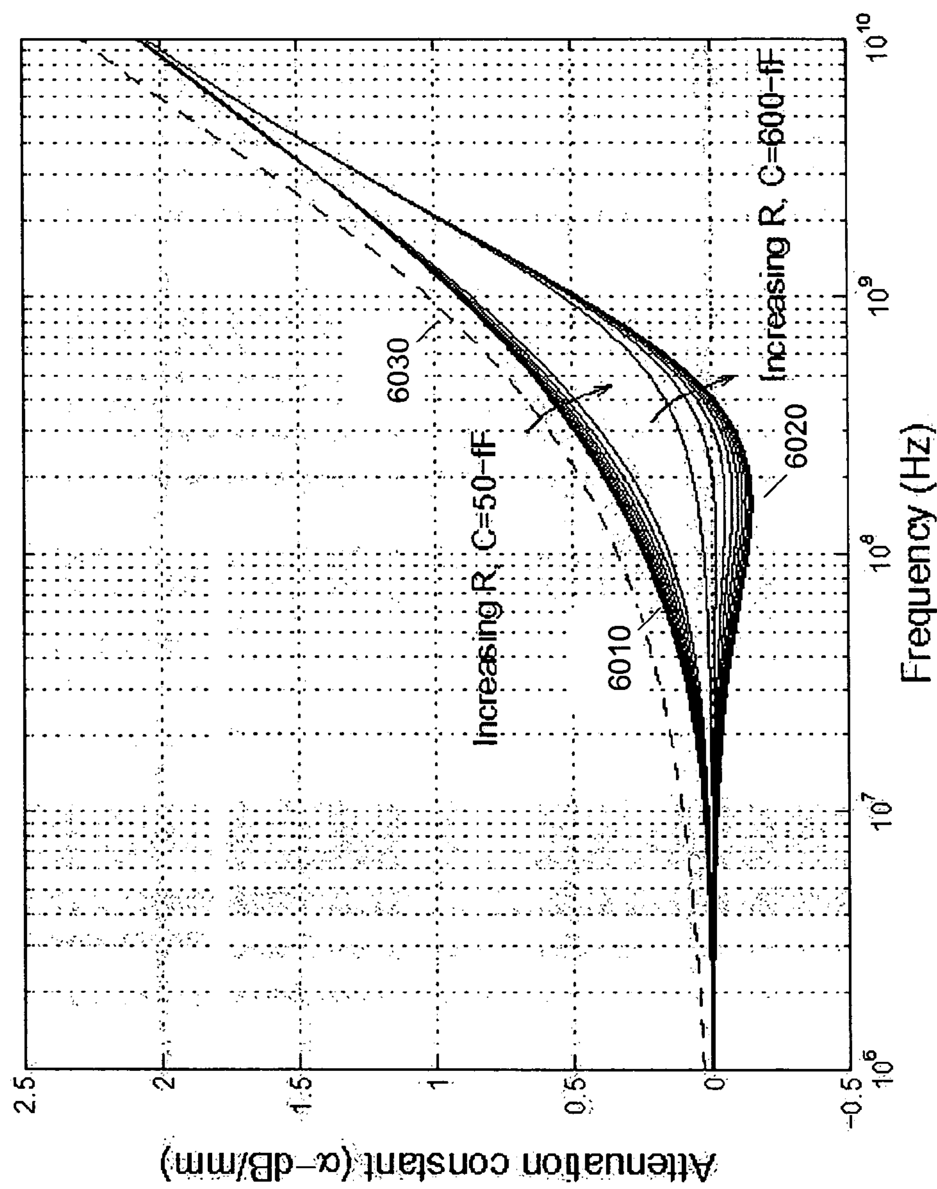
FIG. 6A is a graph showing the attenuation constant for different negative impedance converter designs, and for an interconnect without a negative impedance converter in accordance with some embodiments of the disclosed subject matter.

FIG. 6A is a graph showing the attenuation constant of an interconnect versus frequency. The graph shows two groups of plots 6010 and 6020 for various values of R, and for two different values of C, 50 fF and 600 fF, respectively. For comparison the attenuation constant 6030 (represented by the dashed line) of an uncompensated interconnect is also shown. Increasing the value of C enhances the compensation at higher frequencies (e.g., 20 MHz to 3 GHz) but also increases the risk of the on-chip signaling system becoming unstable ($\alpha<0$). Higher values of R for C=600 fF may make the interconnect unstable. An unstable interconnect may overcompensate for signal attenuation, changing the value of the sent signal.

Figure 6B:
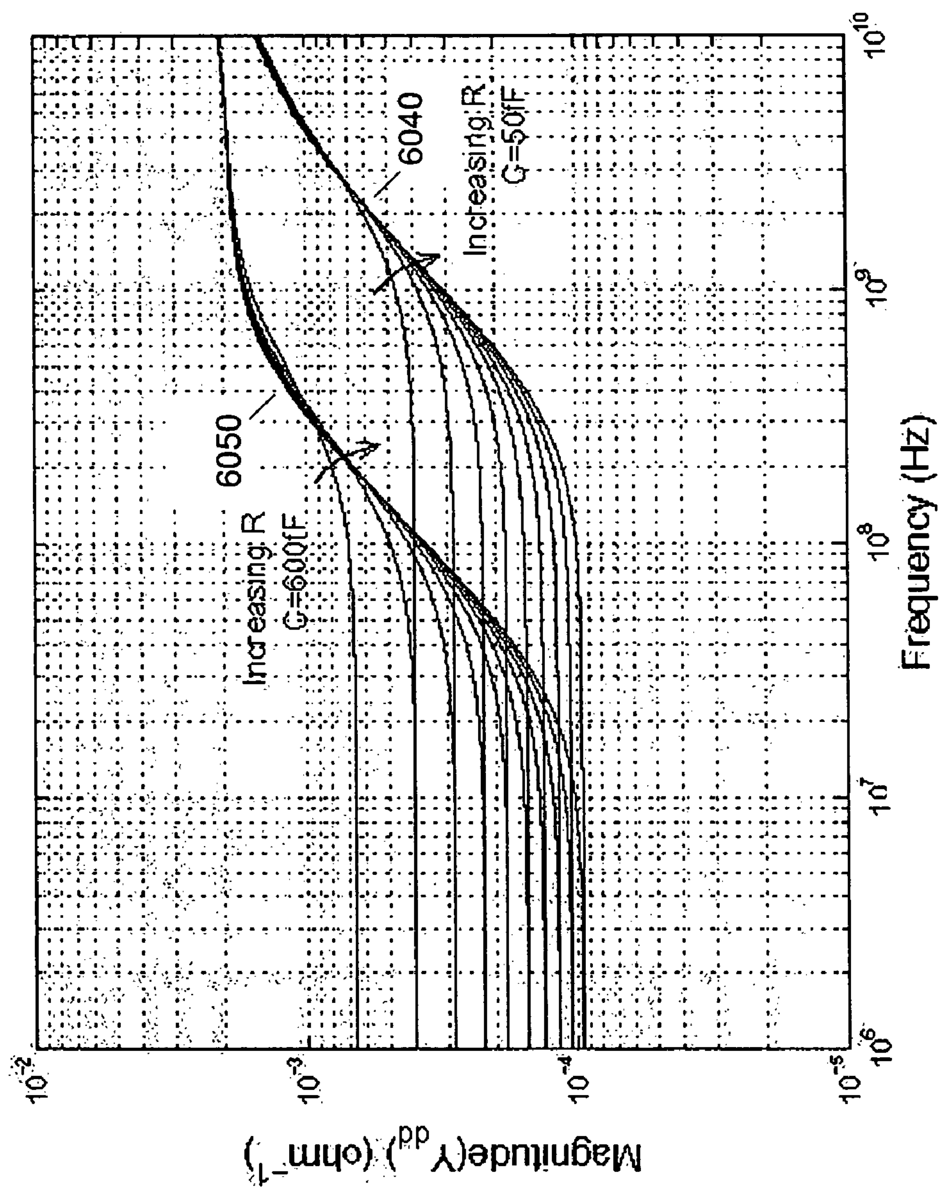
FIG. 6B is a graph showing the magnitude of the admittance for a negative impedance converters as a function of frequency in accordance with some embodiments of the disclosed subject matter.

FIG. 6B is a graph showing two sets of curves 6040 and 6050 for the magnitude of the admittance $Y_{dd}$ for C=50 fF and C=600 fF respectively. $Y_{dd}$ has a zero a 1/RC and a pole at approximately $g_m/C$. There also a right-half-plane zero associated with the device's $f_T$ which is equal to $g_m/C_{gs}$ at frequencies >10 GHz. The device's $f_T$ represents the frequency above which a device has a current gain of less than one, making it unsuitable for providing amplification.

Figure 6C:
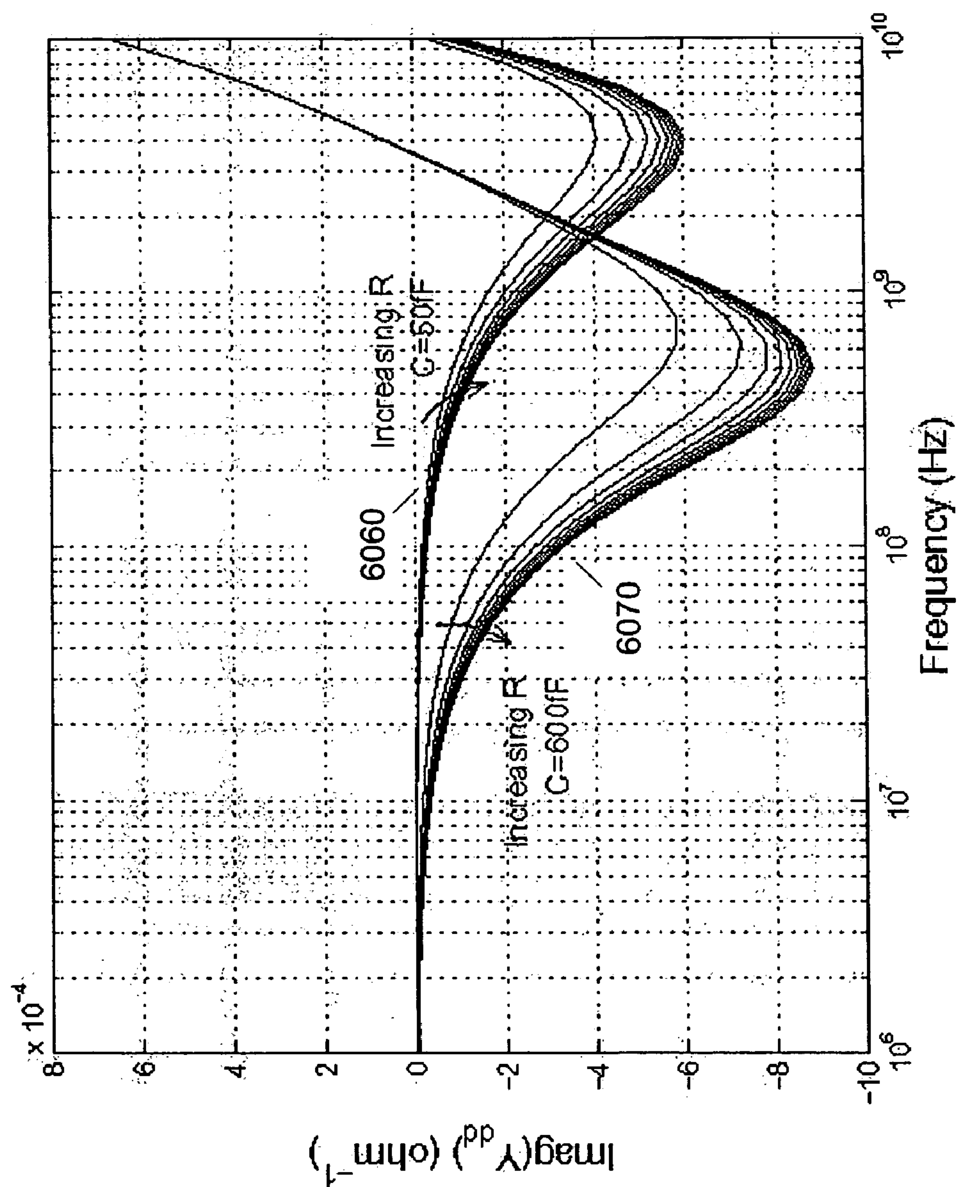
FIG. 6C is a graph showing the imaginary part of the admittance for a negative impedance converter as a function of frequency in accordance with some embodiments of the disclosed subject matter.

FIG. 6C shows two set of curves 6060 and 6070 for the imaginary part of $Y_{dd}$ for C=50 fF and C=600 fF respectively, which is negative for low frequencies (implying a negative capacitance). FIG. 6C shows frequencies for which a NIC 1040 can provide loss compensation. Increasing C to enhance the compensation leads to a lower crossover (negative to positive) frequency for the imaginary part making this compensation less effective at high frequencies.

The operation of one embodiment of the on-chip signaling system is now described with respect to FIG. 1A. The signaling system can be a clocked system that operates with two cycles of latency, including data skewing and de-skewing. The serialized data enters the data skew circuit 1050. The first bit (Data1) of the input can be latched by a skewing latch (not shown) at a rising clock edge of the system clock, followed by a second bit (Data2) which is latched, in a second latch, on at the next falling clock edge of the system clock. Both bits Data1 and Data2 of the input are available at the output of the skewing latches after two clock cycles.

After the data has been latched, it is multiplexed into a single bit stream by predriver 1060. Depending on whether Data1 and Data2 are 1's or 0's, this causes M4 2040 (FIG. 2) or M6 2060 (FIG. 2) and the corresponding branch of the pull-down network, either M4 2040 and M5 2050, or M6 2060 and M7 2070, to be turned on for a half a cycle of the system clock. The clock signal is provided by PLL 1070.

At any instant, one of transistors M1 2120 or M2 2130 of driver 1020 is sourcing current through M3 2030, resulting in a steady-state, common-mode current, $I_D$, upon which a bipolar differential signal current ($\Delta I$) is superimposed. The total current of $2I_D$ drawn from the power supply during normal operation is obtained when either M6 2060 (FIG. 2) and M7 2070 (FIG. 2) (Data2) or M4 2040 (FIG. 2) and M5 2050 (FIG. 2) (Data1) of either pre-driver is switched on. M1 2120 (FIG. 2) and M2 2130 (FIG. 2) cannot be both turned on at any given instant, except in the offset calibration mode, which is discussed below. The ratio $\Delta I = I_D$ is given by $R_T/(R_T+2Z_I)$, where $Z_I$ is the impedance looking into each half of the interconnect.

As the differential signal current travels down interconnect 1010, it is naturally attenuated by the transmission. However, each NIC 1040 acts like a gain element, and compensates for attenuation of the differential signal. As described above (and shown in FIGS. 6B and 6C), by proper design, this compensation can increase with increasing frequency to compensate for the increased attenuation a higher-frequency signal experiences.

When the signal arrives at the receiver, it is de-skewed by deskew circuit 1090 and then provided to inputs 3030 (FIG. 3) and 3040 (FIG. 3) of the receiver, it is then latched into latch 3050 (FIG. 3). The data is then ready to be used by the receiving component.

To adjust clock timing between the driver and receiver, receiver offsets (not shown) within the receiver are calibrated by the clock skew calibration controller 1080 before the interconnect is used. During the receiver calibration mode, the transmitter is configured to source the common-mode current $I_D$ on both lines of the interconnect. This is done by setting the data inputs to each of the two driver transistors M1 2120 (FIG. 2) and M2 2130 (FIG. 2) such that they are never both off at the same time. Following this, a calibration sequence is performed to tune the position of the receiver clock edge to optimally sample the data.

Figure 7:
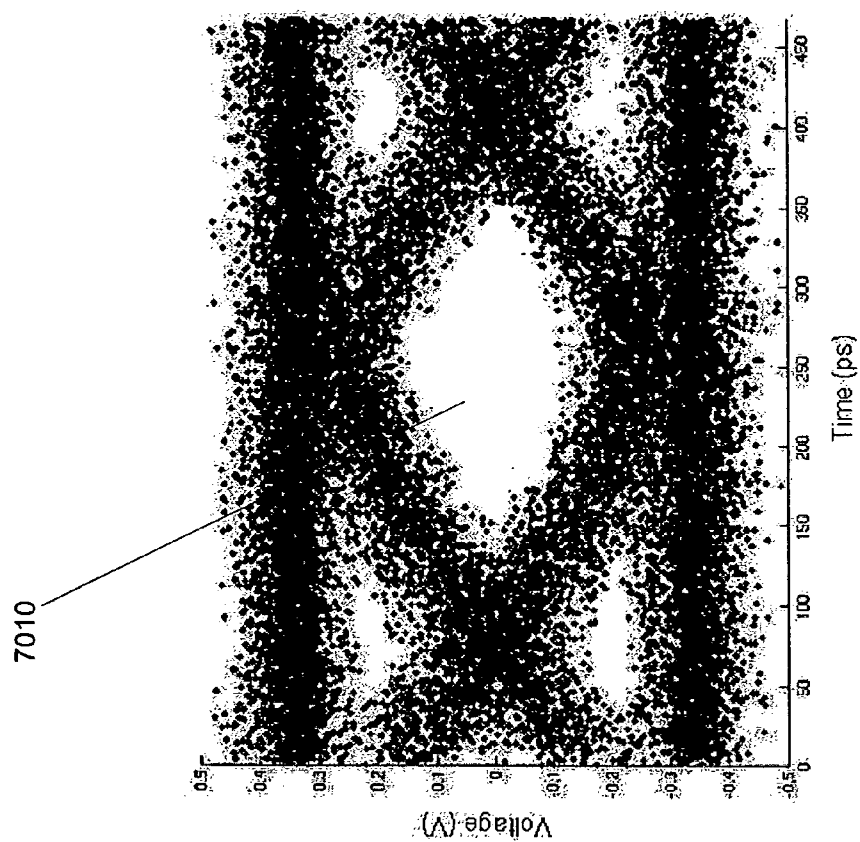
FIG. 7 shows an eye diagram of alternating 0's and 1's transmitted through an interconnect during a calibration sequence in accordance with some embodiments of the disclosed subject matter.

During the calibration sequence, the transmitter is configured to send a bitstream consisting of alternating 0's and 1's. These alternating 0's and 1's are illustrated in an overlapping fashion in the eye diagram of FIG. 7. The data rate of the bitstream defines a window of time 7010 in which the data signal can be sampled by the receiver. The clock skew calibration controller adjusts the receiver to ensure that the signal is sampled properly within this window. Clock delay elements in the receiver, which can be formed from inverter stages with digitally trimmed capacitive loading, can provide any suitable delay for controlling the sampling of the received signal. The calibration controller can vary this clock delay to position the clock edge at the optimal location for receiving of signals on the interconnect.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. An integrated circuit having on-chip signaling between a first component and a second component comprising:

a differential interconnect coupling the first component to the second component;

a driver coupled to the first component that sends data on the differential interconnect;

a receiver coupled to the second component that receives the data; and a plurality of negative impedance converters coupled to the differential interconnect that provide loss compensation; and a data skew circuit coupled to the driver and a data de-skew circuit coupled to the receiver.

2. The integrated circuit of claim 1, wherein each of the plurality of negative impedance converters includes a source degeneration network which compensates for signal attenuation on the differential interconnect.

3. The integrated circuit of claim 2, wherein the source degeneration network is a resistor-capacitor network.

4. The integrated circuit of claim 1, further comprising a pre-driver for multiplexing two data streams onto the differential interconnect.

5. The integrated circuit of claim 1, further comprising a calibration controller for calibrating the receiver.

6. The integrated circuit of claim 1, further comprising a phase lock loop for providing a multiplied clock signal to the driver and the receiver for double data rate operation.

7. The integrated circuit of claim 6, wherein the phase lock loop has a voltage controlled oscillator with shorted current source drains and a cross coupled transistor pair.

8. An integrated circuit having on-chip signaling between a first component and a second component comprising:

a differential interconnect coupling the first component to the second component, wherein the differential interconnect has a co-planar waveguide topology;

a driver coupled to the first component that sends data on the differential interconnect;

a receiver coupled to the second component that receives the data; and a plurality of negative impedance converters coupled to the differential interconnect that provide loss compensation.

9. An integrated circuit having on-chip signaling between a first component and a second component comprising:

a differential interconnect coupling the first component to the second component;

a driver coupled to the first component that sends data on the differential interconnect;

a receiver coupled to the second component that receives the data; and a plurality of negative impedance converters coupled to the differential interconnect that provide loss compensation; and a second driver at the first component, the driver and the second driver each providing a distinct drive current for sending data.

10. A method for on-chip signaling on an integrated circuit comprising:

transmitting a data signal from a first component on the integrated circuit to a second component on the integrated circuit over a differential interconnect;

providing a differential admittance to the data signal; and compensating for data skew between the first component and the second component.

11. The method of claim 10, wherein providing a differential admittance is performed using a source degeneration network which compensates for signal attenuation on the differential interconnect.

12. The method of claim 11, wherein the source degeneration network is a resistor-capacitor network.

13. The method of claim 10, further comprising multiplexing two data streams onto the differential interconnect.

14. A method for on-chip signaling on an integrated circuit comprising:

transmitting a data signal from a first component on the integrated circuit to a second component on the integrated circuit over a differential interconnect;

providing a differential admittance to the data signal; and adjusting the current level of the data signal based on a desired transmission rate.

15. An integrated circuit having on-chip signaling between a first component and a second component comprising:

a means for differentially coupling the first component to the second component;

a means for sending data on the means for differentially coupling located at the first component;

a means for receiving the data at the second component;

a plurality of means for providing loss compensation coupled to the means for differentially coupling; and a means for handling data skew between the means for sending data and the means for receiving data.

16. The integrated circuit of claim 15, wherein each of the plurality of the means for providing loss compensation includes a frequency dependent means for compensating for signal attenuation on the means for sending data.

17. A method for on-chip signaling on an integrated circuit comprising:

transmitting a data signal from a first component on the integrated circuit to a second component on the integrated circuit over a differential interconnect, wherein the differential interconnect has a co-planar waveguide topology; and providing a differential admittance to the data signal.

* * * * *